April 12, 1927.
F. E. GARBUTT
1,624,096
UNIVERSAL PANORAMIC TRIPOD
Filed Sept. 2, 1925   6 Sheets-Sheet 1
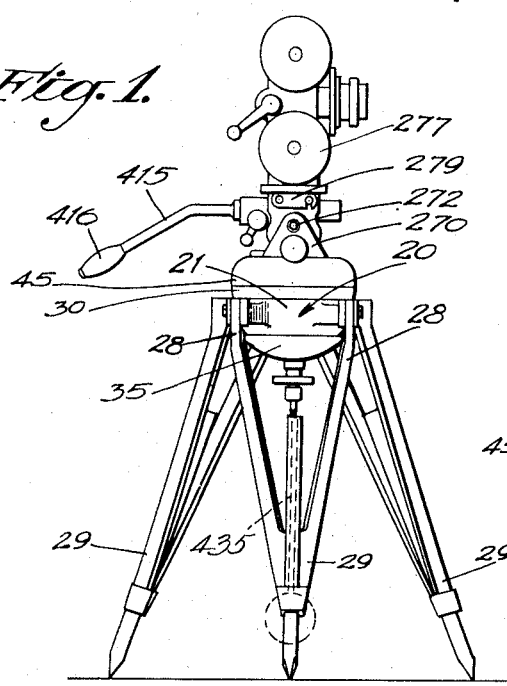
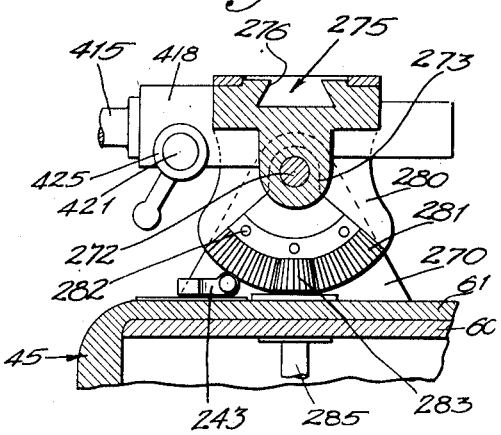
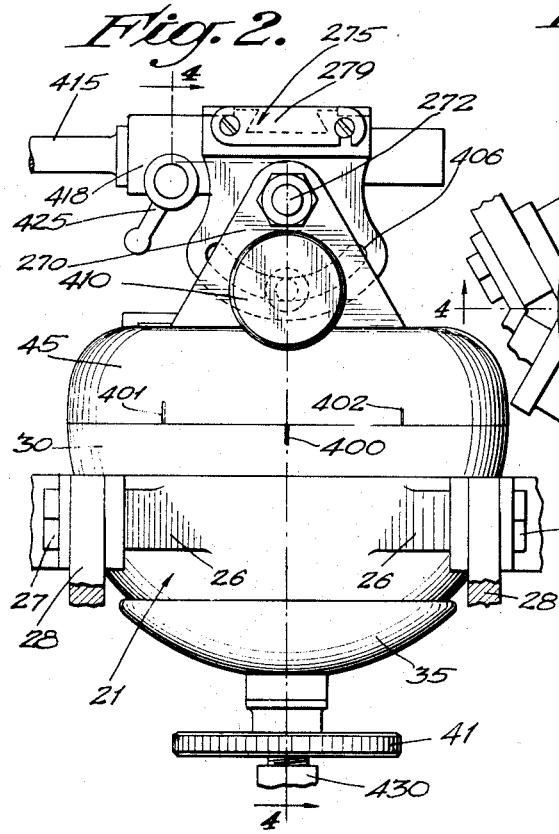
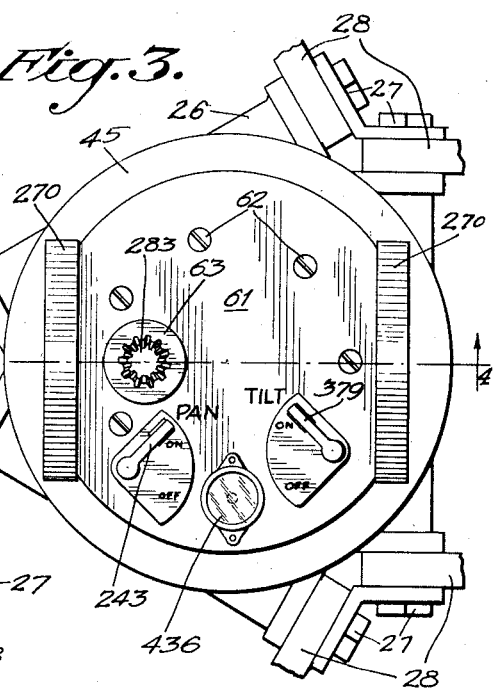
INVENTOR:
FRANK E. GARBUTT,
By Fred W. Davis
ATTORNEY.

April 12, 1927.
F. E. GARBUTT
1,624,096
UNIVERSAL PANORAMIC TRIPOD
Filed Sept. 2, 1925   6 Sheets-Sheet 2
*Fig. 4.*
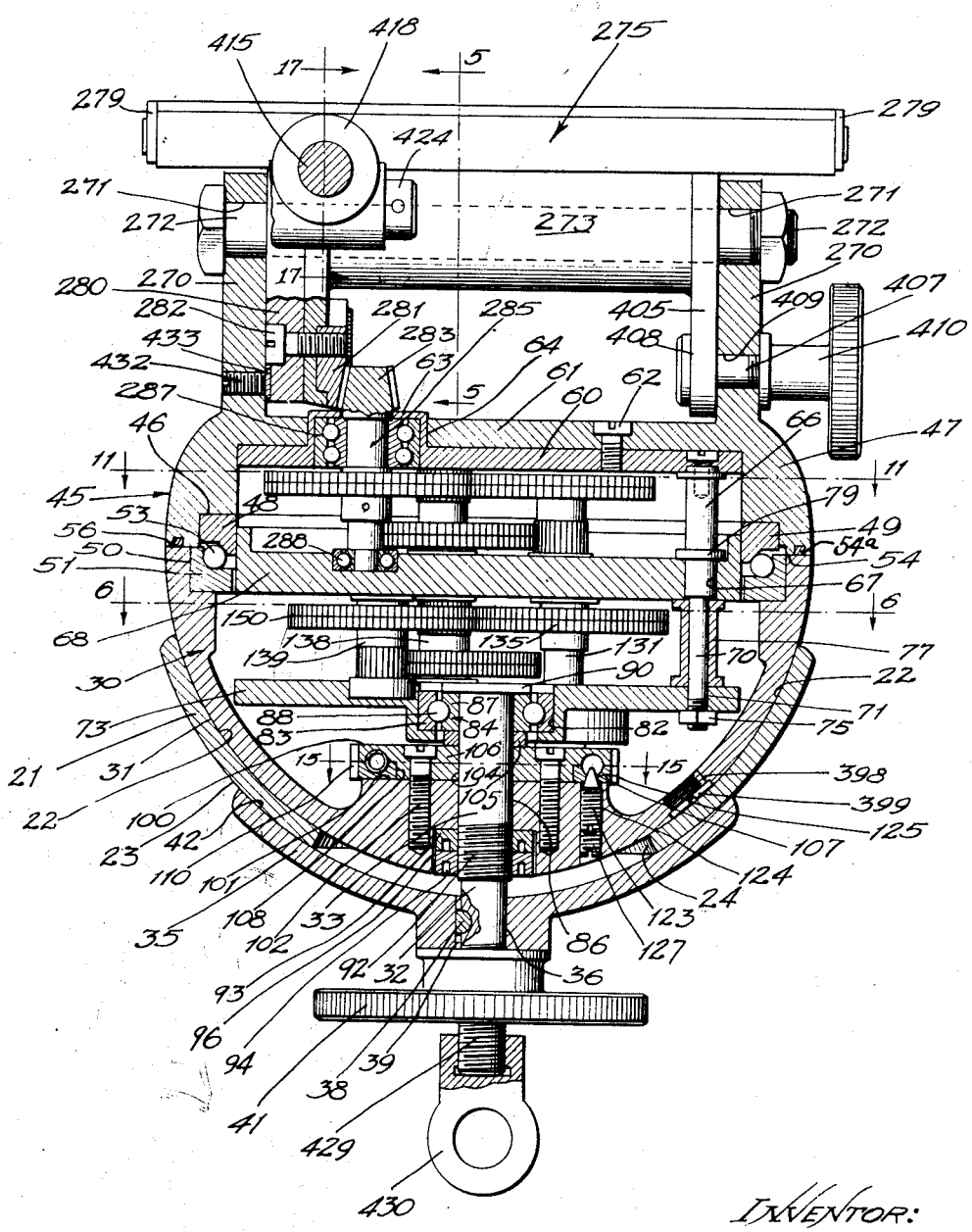
INVENTOR:
FRANK E. GARBUTT,
BY
ATTORNEY.

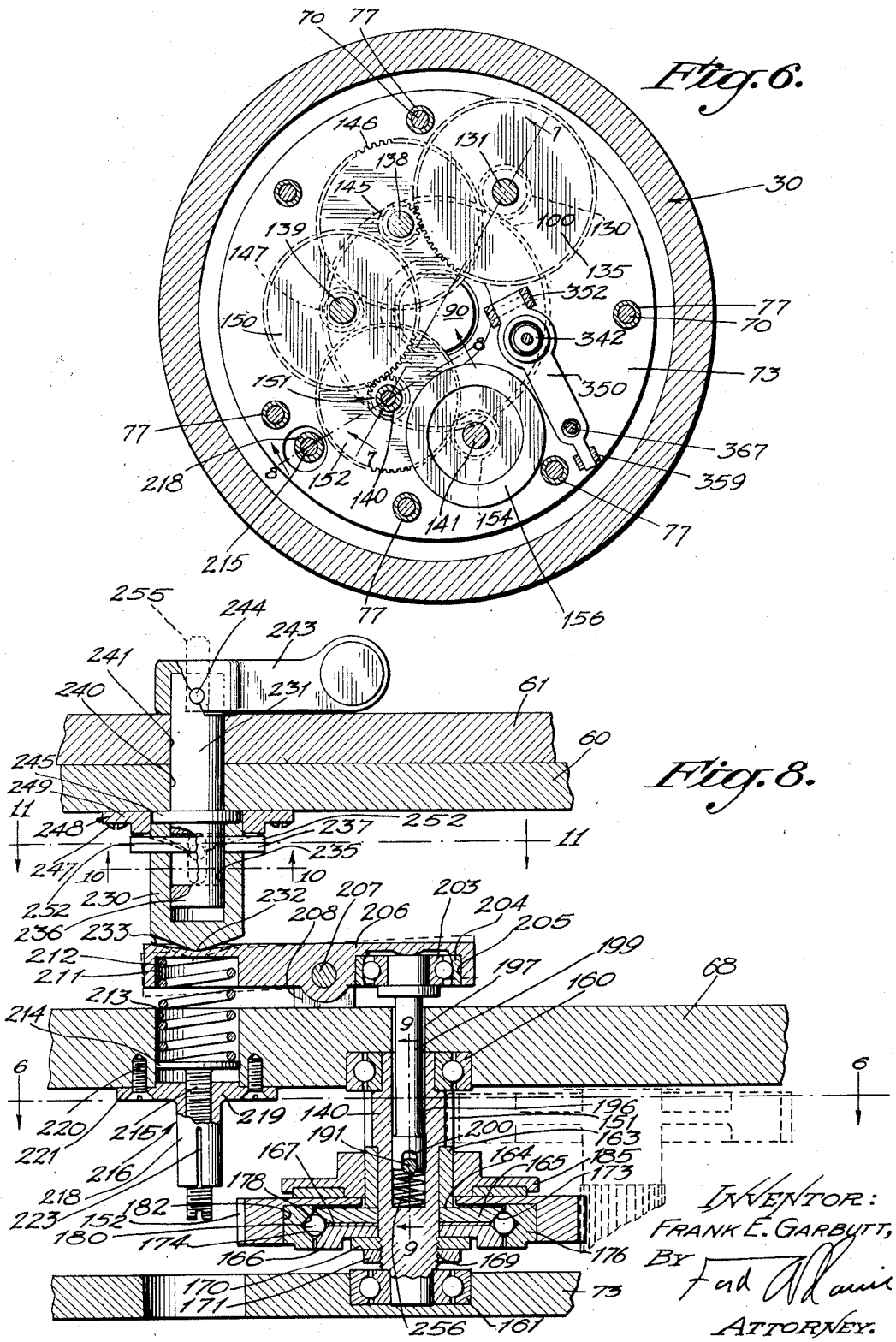

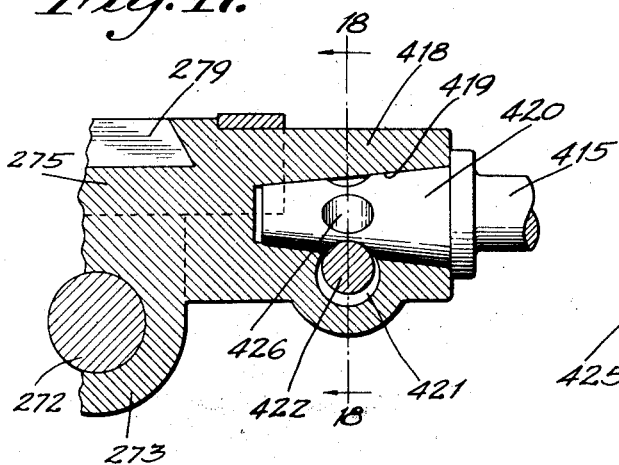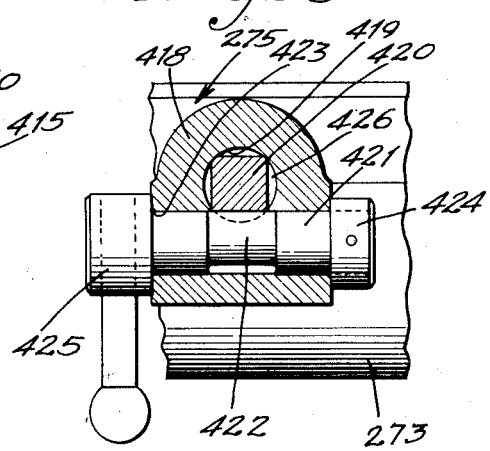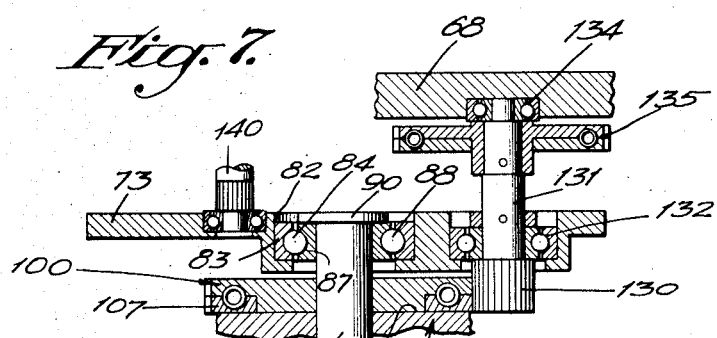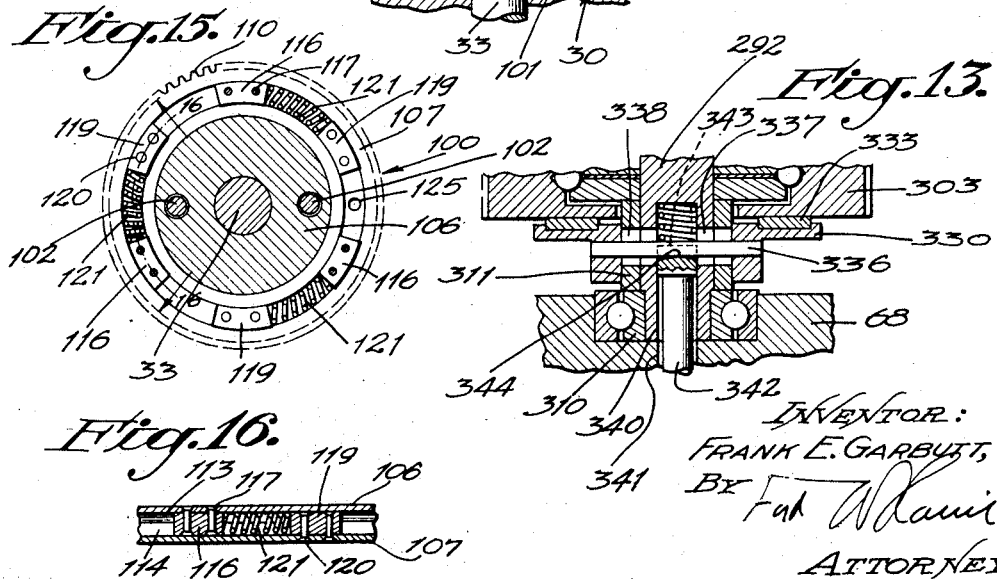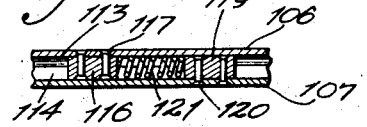

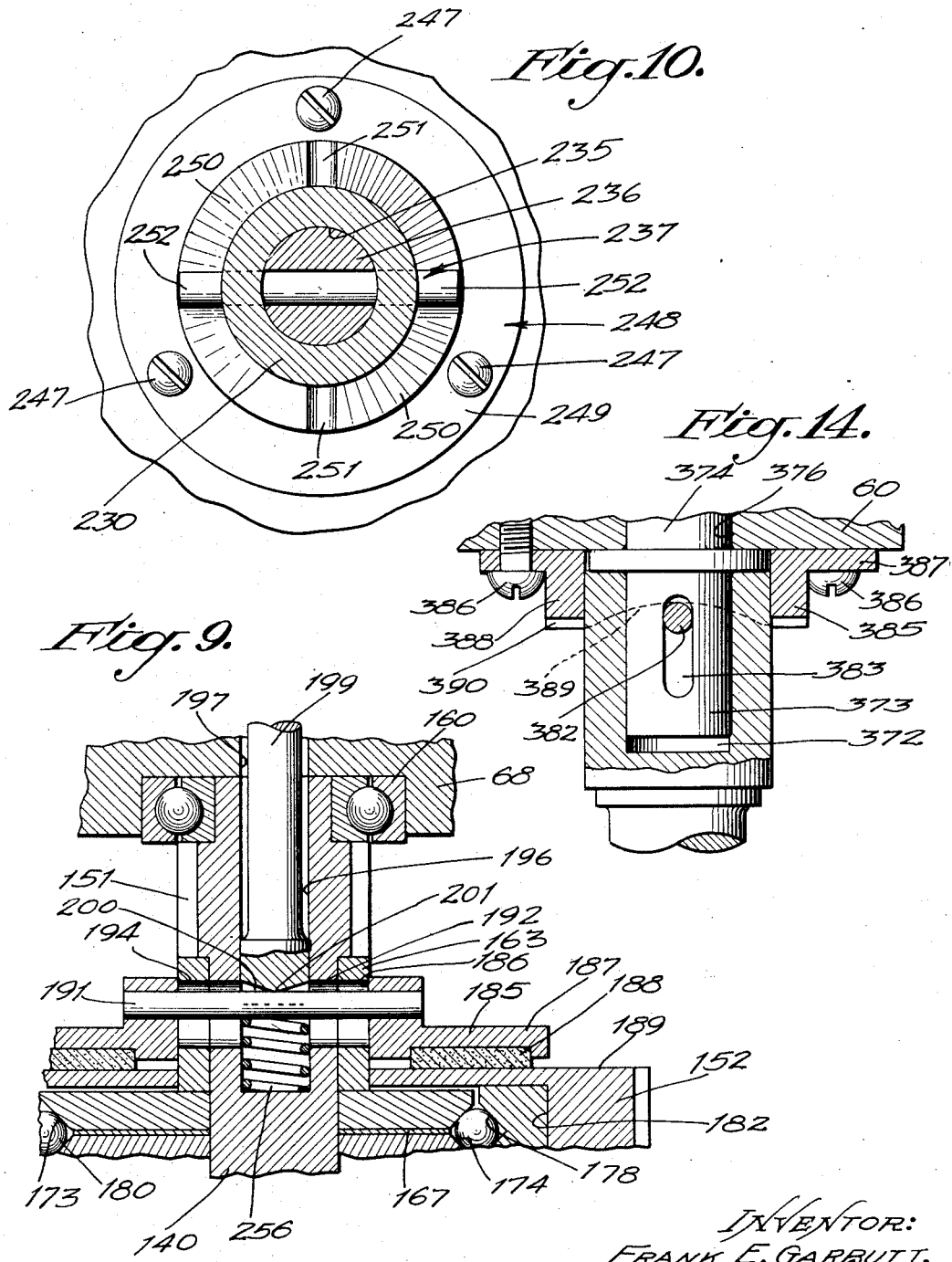

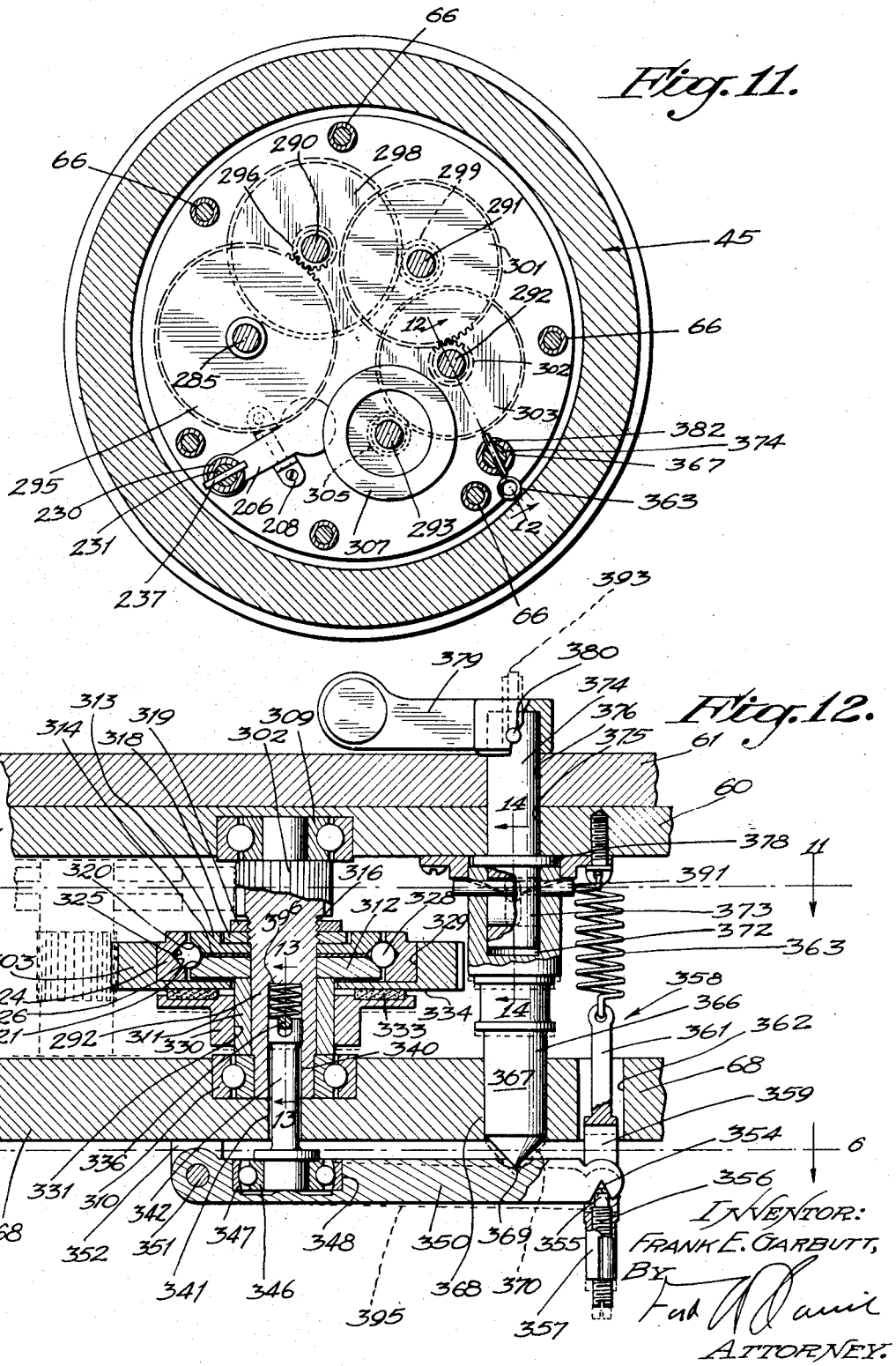

Patented Apr. 12, 1927.

1,624,096

UNITED STATES PATENT OFFICE.

FRANK E. GARBUTT, OF LOS ANGELES, CALIFORNIA, ASSIGNOR TO FAMOUS PLAYERS-LASKY CORPORATION, OF NEW YORK, N. Y., A CORPORATION OF NEW YORK.

UNIVERSAL PANORAMIC TRIPOD.

Application filed September 2, 1925. Serial No. 54,076.

My invention relates to motion picture photography equipment; and it concerns particularly a novel form of panoramic tripod having unique and valuable features which will be described hereinafter.

In "shooting" scenes, it is very often necessary to focus the camera on an object traversing the scene. It is sometimes necessary to follow a vertically moving object. Such horizontal movement of the camera in the art is known as to "pan" and such vertical movement is known as to "tilt". It is imperative that the camera, in following an object, be moved at an even or harmonious velocity so that there will positively be no jerking of the camera. If the camera is moved in a jerky fashion, this will be noticeable on a screen when a positive made from the negative is projected. The effect upon the screen is that the scene appears to have the same jerky movement that the camera actually had in taking the scene. This deficiency is very disagreeable to an observer of the production, since it detracts attention from the action of the picture and places a strain on the observer's eyes.

For the above reasons, the camera man is required to use exceptional care in following objects.

It is an object of my invention to provide a tripod on which a camera attached thereto may be panned or tilted or simultaneously panned and tilted.

It is another object of my invention to provide a tripod in which the pan and tilt of the camera is effected by a single operating lever.

It is another object to provide a tripod of the character mentioned having means which permit the camera to be panned or tilted only in harmonious movement.

It is another object of my invention to provide a tripod which is so designed that there will be no play or backlash in any of the parts.

It is a further object of my invention to provide a tripod having means which permits a quick focus of the camera carried thereby on an object.

It is a still further object of my invention to provide a tripod in which the above mentioned means which permits only a harmonious pan and tilt of the camera, is capable of setting to permit different velocities of both pan and tilt.

It is also an object of my invention to provide a tripod of the character mentioned in which the change of velocity of the pan and tilt of the camera is effected by a simple regulation of levers.

It is an object of my invention to provide a tripod having a head which may be leveled independent of the legs which support it.

It is another object of my invention to provide a tripod of the character mentioned having a unique construction of clutch.

It is a further object of my invention to provide a tripod of the character mentioned having novel clutch operating mechanism.

It is a still further object of my invention to provide in a tripod of the character mentioned, a gear of which the outer annular portion is rotatable relatively to the inner portion in which a unique means of bearing assembly is incorporated.

Other objects and the salient advantages of this invention will be evidenced hereinafter.

Referring to the six sheets of drawings in which I illustrate a preferred form of my invention, Fig. 1 is an elevational view of a complete tripod embodying the features of my invention.

Fig. 2 is an elevational view on a larger scale than Fig. 1, showing a head of my tripod, the camera which it supports being removed from place.

Fig. 3 is a plan view of the head shown in Fig. 1, the tilting member of this head being removed from place.

Fig. 4 is an enlarged fragmentary section taken on the line 4—4 of Fig. 2, this view showing the interior mechanism of the head.

Fig. 5 is a section taken on the line 5—5 of Fig. 4, this view showing certain of the construction associated with the tilting member of my invention.

Fig. 6 is a cross sectional view taken on the line 6—6 of Fig. 4, this view showing a chain of traversing control gears of my invention.

Fig. 7 is a fragmentary sectional view taken as indicated by the line 7—7 of Fig. 6, this view clearly showing the drive gear for the chain of traversing control gears and the manner in which it is associated therewith.

Fig. 8 is a fragmentary section taken substantially as indicated by the line 8—8 of Fig. 6, this view clearly showing the traversing clutch mechanism and the means for operating same.

Fig. 9 is a fragmentary section taken on the line 9—9 of Fig. 8.

Fig. 10 is a fragmentary section taken on the line 10—10 of Fig. 8.

Fig. 11 is a cross section taken on the line 11—11 of Fig. 4, this view showing a chain of tilting control gears of my invention.

Fig. 12 is an enlarged fragmentary view showing in detail the tilting control clutch mechanism of my invention and means for operating the same.

Fig. 13 is an enlarged fragmentary section taken on the line 13—13 of Fig. 12.

Fig. 14 is an enlarged fragmentary section taken on the line 14—14 of Fig. 12.

Fig. 15 is a fragmentary section taken on the line 15—15 of Fig. 4, this view clearly showing the construction of the driving gear of my invention.

Fig. 16 is a fragmentary sectional detail taken as indicated by the line 16—16 of Fig. 15.

Fig. 17 is a fragmentary sectional view taken on the line 17—17 of Fig. 4, this view clearly showing the manner in which an operating lever of my invention is secured to the tilting member of my invention.

Fig. 18 is a fragmentary section taken as indicated by the line 18—18 of Fig. 17.

As shown in the drawings, and particularly in Figs. 1, 2 and 4, the tripod of my invention comprises a supporting member 20 having a cup-shaped portion 21 which has an inner semi-spherical face 22 and an outer semi-spherical face 23. A central opening 24 is formed in the lower part of the cup-shaped portion 21. Extending from the cup-shaped portion 21 are protuberances 26, shown in Figs. 1 and 2, into which cap screws 27 extend for securing the upper ends 28 of tripod legs 29 thereto. A pivot member 30 which is hemi-spherical in shape, has an outer semi-spherical face 31 which is adapted for engagement with the inner semi-spherical face 22 of the portion 21 of the supporting member 20. Extending from the lower part of the pivot member 30 is a lower end 32 of a shaft 33. This shaft 33, in addition to the function I am now describing, performs another function which will be explained later on in this specification.

The lower end 32 of the shaft 33 extends through the opening 24 of the cup-shaped portion 21 of the supporting member 20. A clamp member 35 has a central opening 36 through which the lower end 32 extends. The clamp member 35 is permitted to move axially on the lower end 32 of the shaft 33 but is prevented from rotational movement by a key 38 which extends into an axial key-way 39 formed in the opening 36 in the clamp plate 35. A wheel nut 41 is threaded on the lower portion 32 of the shaft 33 below the clamp plate 35 and is provided for the purpose of clamping a semi-spherical face 42 of the clamp plate 35 into engagement with the lower semi-spherical face 23 of the portion 21.

Supported by the pivot member 30 is a traversing member 45 which is of the shape of an inverted cup. An annular channel 46 is formed in the lower end near part of a cylindrical wall 47 of the traversing member 45. Situated in this channel 46 is an interrupter race 48 of a traversing member supporting bearing 49. An annular channel 50 is formed in the upper part of the pivot member 30, and in this annular channel 50 is a lower bearing race 51. Situated between the bearing races 48 and 51 is a multiplicity of balls 53. The ball bearing 49 rotatably supports the traversing member 45 of the pivot member 30 so that a lower face 54 of the wall 47 of the traversing member 45 is in intimate proximity with an upper face 56 of the pivot member 30. Between the adjacent faces 54 and 56 there is positioned a dust ring 54ᵃ of felt or other suitable material, said ring being in the present instance retained in a concentric groove in the face 54. An upper bearing plate 60 is secured against an inner face of a top wall 61 of the traversing member 45 by suitable machine screws 62. The upper bearing plate 60 has a cylindrical projection 63 which extends through an opening 64 of the upper wall 61 of the traversing member 45. Extending downwardly from the upper bearing plate 60 is a plurality of bearing plate studs 66, one of which is shown in Fig. 4. Lower ends of these studs 66 extend through openings 67 formed in a central bearing plate 68. This central bearing plate 68 is situated directly below the upper bearing plate 60. Extending from the lower portions of the studs 66 are stems 70 which project through openings 71 formed in a lower bearing plate 73. Nuts 75 are threaded on lower extending ends of the stems 70 and clamp the lower bearing plate 73 into engagement with sleeves 77 which are positioned on the stems 70 above this lower bearing plate 73. The upper ends of the sleeve 77 engage a lower face of the central bearing plate 68, forcing this plate 68 upwardly until an upper face thereof engages annular flanges 79 formed on the studs 66. The bearing plates 60, 68 and 73 are thus clamped together as described. The lower bearing plate 73 has a concentric cylindrical pocket 82 in which an outer race 83 of a bearing 84 is placed. The shaft 33, which has been previously mentioned, extends through a concentric opening 86 of the pivot member 30 and extends concentrically through the pocket 82. As shown in Figs. 6 and 7 the upper end of the shaft 33 carries an inner race 87 of the ball bearing 84; balls 88 are operatively placed between the outer and inner bearing races 83 and 87. The upper end of the shaft 33 is provided with a head 90 having a shoulder which engages an upper face of the inner bearing race 87. The shaft 33 is threaded, as indicated at 92, and a nut 93 and a locknut 94 are threaded thereon at this place. A cavity 96 is formed in the pivot member 30 to receive these nuts 93 and 94.

A concentric drive gear 100 is secured to a traverse face 101 of the pivot member 30 by means of cap screws 102. The drive gear 100 has a concentric opening 104 through which the shaft 33 extends.

In assembling the traversing member 45 and the pivot member 30 together, it is necessary that these members have absolutely no vertical play, and it is very desirable to place the ball bearing 49 under a minute degree of tension. The exact degree of this tension is determined by the thickness of a washer 105 placed upon the shaft 33 between the inner race 87 and the upper face of the concentric drive gear 100. The thickness of the washer 105 is such that when tension is placed on the bearing by tightening the nut 93 upon the threaded portion 92 of the shaft 33, the proper tension on the ball bearing 49 is attained. After this the lock nut 94 is rotated into engagement with the nut 93, thus preventing it from being loosened. When the traversing member is rotated, the shaft 33 and the inner race 87 of the ball bearing 84 remains stationary, whereas the outer race 83 of the ball bearing 84 and the parts associated therewith may revolve.

Referring in particular to Figs. 4, 15 and 16, the drive gear 100 is provided in the form of a stationary portion 106 and a movable portion 107. The movable portion 107 is placed in an annular channel 108, formed by the stationary portion 106 and an outer annular portion of the face 101 of the pivot member 30. The peripheries of the stationary and movable portions 106 and 107 are formed to provide gear teeth 110. Formed in the stationary portion 106 is an annular channel 113 which is semi-circular in cross section, and formed in the movable member 107 is an annular channel 114 which is also semi-circular in cross section. These semi-annular channels 113 and 114 cooperate when the parts are placed, as shown in the drawings, to form a cylindrical annular channel. Short lugs 116 of cylindrical cross section are secured in the cylindrical annular channel to the stationary member 106 by rivets 117, and short lugs 119 of cylindrical cross section are secured in the cylindrical annular channel to the movable portion 107 by rivets 120. The lugs 116 and 119 are alternately placed so that they are separated by substantial distances. Operating between each of the pairs of lugs 116 and 119 are coil compression springs 121. These springs 121 tend to act on the lugs 116 and 119 and tend to rotationally move the stationary portion and the movable portion 106 and 107 relatively to each other and to offset the upper and lower portions of the gear teeth 110. The stationary and movable portions 106 and 107 of the drive gear 100 are locked against relative rotation and so that the upper and lower portions of the gear teeth 110 align until after the head is properly assembled by means of a pointed set screw 123 which is threaded into an opening 124 of the pivot member 30 so that the point thereof extends into an opening 125 provided in the movable portion 107 of the drive gear 100. The set screw 123 is locked in place by a short screw 127 which is threaded into the opening 124 below the set screw 123. Further details of this construction will be mentioned hereinafter.

Engaging the drive gear 100 is a first traversing pinion 130, as shown in Fig. 7. This traversing pinion 130 is situated at the lower end of a first shaft 131 which extends through the lower bearing plate 73. The first shaft 131 is rotatably supported in a ball bearing 132 supported by the lower bearing plate 73 and by a bearing 134 supported by the central bearing plate 68. Secured on the shaft 131 at the upper end thereof is a first traversing gear 135 which is placed between the central and lower bearing plates 68 and 73.

With reference to Fig. 6, a second shaft 138, a third shaft 139, a fourth shaft 140 and a fifth shaft 141 are rotatably supported by the central and lower bearing plates 68 and 73. The second shaft 138 has a second traversing pinion 145 which meshes with the first traversing gear 135. A second traversing gear 146 is carried on the second shaft 138 and engages a third traversing pinion 147 which is carried on the third shaft 139. A third traversing gear 150 is secured to the third shaft 139 and engages a fourth traversing pinion 151, carried on the fourth shaft 140. A fourth traversing gear 152 is secured to the fourth shaft 140 and drives a fifth traversing pinion 154 which is secured on the fifth shaft 141. Rigidly secured on the fifth shaft 141 is a traversing fly wheel 156. The pinions 130, 145, 147, 151 and 154 and gears 135, 146, 150 and 152 comprise the chain of traversing control gears of my invention.

When the traversing member 45 is panned or traversed, that is to say, rotated on the pivot member 30, the first pinion 130 operates around the concentric drive gear 100 and is rotated thereby. The rotation of this pinion 130 operates the other pinions and the other gears of the chain of traversing control gears of my invention, which has just been described, and operates the fly wheel 156. By this mechanism considerable inertia against movement of the traversing member 45 is applied thereto and permits the traversing member 45 to be traversed only at a harmonious rate of travel. The traversing member cannot, when the fly wheel is drivably connected therewith, be moved in a jerky manner.

My invention provides means whereby the fly wheel may be disconnected so that the traversing member may be moved at a higher velocity and means whereby the traversing member may be quickly traversed so that a camera carried by the tripod may be focused on a moving object.

As shown clearly in Figs. 8, 9 and 10, the fourth shaft 140 is rotatably supported by ball bearings 160 and 161 which are supported in the central bearing plate 68 and the lower bearing plate 73 respectively. A sleeve 163 is placed on the shaft 140 below the pinion 151. An upper face 164 of a primary inner bearing race 165 engages a lower face of the sleeve 163. Placed on the shaft 140 below the primary inner bearing race member 165 is a secondary inner race bearing member 166 which is separated from the member 165 by a shim 167. The shaft 140 is threaded at 169 and placed on this threaded portion 169 is a nut 170 and a lock nut 171. The nut 170 clamps the members 165 and 166 and the shim 167, which is placed between them, rigidly against the sleeve 163. An angular face 173 of the member 165 and an angular face 174 of the member 166 cooperate to provide an inner bearing race. Surrounding the members 165 and 166 is an outer bearing race member 176 which has angular faces 178 which provide an outer bearing race. In the inner and outer bearing races of the primary inner bearing race member 165 and the secondary inner race member 166 and the outer bearing race member 176 are balls 180. The outer bearing race member 176 is pressed into a cylindrical recess 182 of the fourth traversing gear 152 so it is seen that the fourth traversing gear 152 is rotatably carried on the fourth shaft 140.

The type of bearing provided for this occasion is designed so that the inner race provided by the angular faces 173 and 174 may be adjusted in position so that when the bearing is assembled there will be absolutely no play between the inner and outer race members. This is absolutely essential so that there will be no play at this point. In assembling this bearing it is necessary to find a shim 167 which is of proper thickness to provide the correct adjustment of the inner race. This is only found by trying different shims until the proper one is found. Placed on the sleeve 163 is a traversing clutch plate 185, shown in Figs. 8 and 9, having an opening 186 through which the sleeve 163 extends. An annular flange 187 of the clutch plate 185 carries a felt washer 188 which is adapted to engage an upper face 189 of the gear 152. The clutch plate 185 is drivably locked to the shaft 140 by a diametrically extending pin 191. This pin 191 extends through a slot 192 of the shaft 140 which is elongated in the direction of the axis of the shaft and through slots 194 formed in the sleeve 163 which are elongated in the same direction with the slot 192 of the shaft 140. The pin 191 permits relative axial movement between the shaft 140 and the clutch plate 185 but prevents relative rotational movement between these parts.

A cylindrical concentric opening 196 is formed in the shaft 140 from the upper end thereof. Access to the opening 196 is provided by a co-extensive opening 197 formed in the central bearing plate 68. Extending into the opening 196 is a release pin 199. The lower end of the release pin 199 is provided with a slot 200 which is open at the lower end of the pin, through which slot 200 the diametrically extending pin 191 is extended. The bottom of the slot 200 is formed to provide a central point 201 which engages the pin 191. As shown in Fig. 8, the upper end of the release pin 199 is received in an inner race 203 of a bearing, an outer race 204 of which is pressed into a cavity 205 of a lever 206. The lever 206 is pivoted near its center on a shaft 207 which is supported in brackets 208 which are secured to an upper face of the central bearing plate 68. The other end of the lever 206 is provided with a downwardly opening cavity 211 which receives the upper end of a compression spring 212. The lower part of the compression spring 212 extends into a cylindrical opening 213 formed in the central plate 68. The lower end of the compression spring 212 engages a flange 214 which is formed at the upper end of a threaded shaft 215 of a tension adjuster 216. The tension adjuster 216 is threaded through a cylindrical portion 218 of an adjuster post 219 which is secured to the lower face of the central plate 68 by screws 220 which extend through a flange 221 of the adjuster post. The lower part of the cylindrical portion 218 is provided with slots 223, thus forming a plurality of jaws which are sprung inwardly so that a resilient pressure is exerted upon the threaded shaft 215 which prevents the adjuster 216 from working loose. The clutch plate 185 is caused to frictionally engage the gear 152 by the resilient pressure of the compression spring 212 on the lever 206. This spring 212 operates the lever 206 in such a manner that the release pin 199 forces inwardly on the diametrically extending pin 191, thus causing the felt washer 188 of the clutch plate 185 to engage the face 189 of the gear 152.

The pressure which causes the clutch plate 185 to engage the gear 152 is removed therefrom by means of a release sleeve 230 which is carried on the lower end of a release shaft 231. The release sleeve 230 has a point 232 which engages the lever 206 in a recess 233. Referring now to Figs. 8 and 10 the release sleeve 230 has a cylindrical opening 235 into which a lower end 236 of the release shaft 231 extends. A pin 237 extends through a neat hole in the release sleeve 230 and a longitudinal slot in the release shaft 231 for locking these parts together. The release sleeve 230 and the release shaft 231 are prevented from relative rotation but are permitted a limited longitudinal shifting relative to each other. The release shaft 231 extends through openings 240 and 241 formed in the upper bearing plate 60 and the upper wall 61 of the traversing member 45. To the upper extending end of the release shaft 231 there is secured an operating lever 243 by means of a pin 244 in such a manner as to hold a flange 245, provided upon the shaft 231, into engagement with the lower face of the upper bearing plate 60. Secured to the lower face of the upper bearing plate 60 by means of screws 247 is a cam member 248, these screws 247 extending through a flange 249 thereof. As shown best in Fig. 10 the cam member 248 is provided with pairs of cam faces 250 and diametrically opposite grooves 251. Cam followers 252 which, in the embodiment shown in the drawings, are the ends of the pin 237, are adapted to operate on the cam faces 250 or to rest in the grooves 251 according to how the parts are operated. In the drawings, and as shown clearly in Fig. 8, the parts are so situated that the clutch and the operating mechanism just described, are in engaged position. When it is desired to disconnect the traversing fly wheel 156, shown in Fig. 6, from the chain of traversing control gears, the operating lever 243 is swung 90° into the position indicated by dotted lines 255 of Fig. 8. This rotates the release shaft 231 and the release sleeve 230 a fourth of a revolution. At this time the cam engagers 252 ride downwardly on the cam faces 250 and rest in the channels 251. This action of the followers 252 and the cam faces 250 moves the release sleeve 230 downward relative to the release shaft 231. This moves the left end of the lever 206 downwardly against the action of the compression spring 212 and swings the right end of this lever 206 upwardly as shown by dotted lines in Fig. 8. This upward movement of the right end of the lever 206 removes the release pin 199 from engagement with the diametrically extending pin 191, thus reducing the pressure on the clutch plate 185. A coil spring 256 is placed in the bottom of the cylindrical opening 196 and when the release pin 199 is moved upwardly this spring 256 operates on the diametrically extending pin 191 and resiliently moves the clutch plate 185 upwardly so that the felt washer 188 thereof is disengaged from the face 189 of the gear 152. The gear 152 at this time will stop rotation and the shaft 140 and the inner race members 165 and 166 and the clutch plate 185 will rotate. The magnitude of the force retaining the clutch plate 185 in engagement with the gear 152 may be varied by adjusting the position of the adjuster 216 in the cylindrical portion 218 of the post 219.

Referring now to Figs. 1 to 5 inclusive, in particular, the traversing member 45 has a pair of opposing legs 270 extending upward therefrom. Extending through openings 271 of the legs 270 is a shaft 272. This shaft 272 also extends through a hub portion 273 of a tilting member 275. The tilting member 275 is provided with an upper dovetailed slot 276 which receives a dovetail portion of a camera 277. This dovetail portion of the camera (not shown) is locked in the dovetail slot 276 by clips 279. The tilting member 275 is adapted to rotatably swing on the bolt 272 and on a horizontal axis. A wall 280 extends downwardly from the left end of the tilting member 275, Fig. 4, and has secured thereto a segmental operating gear 281, this gear being secured to this wall 280 by means of machine screws 282. The segmental operating gear 281 engages a first tilting pinion 283 which is secured to the upper end of a first shaft 285. This shaft 285, as clearly shown in Fig. 4, is rotatably supported at its upper end by a bearing 287 which is retained in the cylindrical projection 63 of the upper bearing plate 60 and its lower end by a bearing 288 which is secured in the upper face of the central bearing plate 68. As shown clearly in Figs. 4 and 11, the upper and central bearing plates 60 and 68 rotatably support the first shaft 285, a second shaft 290, a third shaft 291, a fourth shaft 292 and a fifth shaft 293, these shafts extending between the upper and central plates 60 and 68. Secured to the first shaft 285 is a first tilting gear 295 which engages with a second tilting pinion 296 secured to the second shaft 290. A second tilting gear 298 is secured to the second shaft 290 and engages and drives a third tilting pinion 299 which is secured on the third shaft 291. A third tilting gear 301 is secured on the third shaft 291 and engages a fourth tilting pinion 302 which is secured on the fourth shaft 292. Also secured on the fourth shaft 292 is a fourth gear 303 which drives a fifth pinion 305 which is secured on the fifth shaft 293.

A tilting control fly wheel 307 is secured on the fifth shaft 293. The tilting pinions 283, 296, 299, 302 and 305, and the tilting gears 295, 298, 301 and 303 comprise a chain of tilting control gears of my invention.

When the tilting member 275 is tilted the operating gear segment 281 is rotationally moved and the first pinion 283 is operated. This drives the entire chain of tilting control gears and rotates the tilting control fly wheel 307. This arrangement of gears and fly wheel controls the operation of the tilting member in the same manner as the chain of traversing control gears and the traversing control fly wheel controls the traversing of the traversing member.

When a force is exerted upon the tilting member to tilt it, this force must drive the chain of tilting control gears and the fly wheel. It is impossible to move the tilting member any faster than the chain of gears and the fly wheel will allow, and it is impossible to tilt the tilting member in a jerky manner.

My invention also provides means whereby the tilting control fly wheel may be disconnected from the chain of tilting control gears. With reference particularly to Figs. 12, 13 and 14, the fourth shaft 292 is supported by the upper and central bearing plates 60 and 68 by an upper bearing 309 and a lower bearing 310. A sleeve 311 is placed upon the shaft 292 near the lower end thereof and just above the lower bearing 310. Placed on the shaft 292 above the sleeve 311 is a primary inner bearing race member 312 and a secondary inner race member 313, these members being separated by a shim 314. The shaft 292 is threaded at 316 just below the fourth tilting pinion 302. A nut 318 and a lock nut 319 are placed on this threaded portion 316. The nut 318 and the lock nut 319 are provided to rigidly clamp the members 312 and 313 and the shim 314 securely in place against the upper end of the sleeve 311. A beveled face 320 of the member 313 and a beveled face 321 of the member 312 operate to provide an inner bearing race. Surrounding the primary and secondary inner race members 312 and 313 is an outer race member 324 providing an outer race which consists of beveled faces 325 and 326. Balls 328 are placed between the inner and outer races. The outer race member 324 is pressed into a cylindrical opening 329 of the fourth tilting gear 303. The members of this bearing construction are substantially the same as in the similar construction used in the traversing clutch mechanism and this bearing is adjusted in substantially the same manner.

A tilting clutch plate 330 is placed on the sleeve 311 below the gear 303, the sleeve 311 extending through an opening 331 of the clutch plate 330. The felt washer 333 carried by the clutch plate 330 engages a lower face 334 of the gear 303. The clutch plate 330 is rendered non-rotatable on the shaft 292 by means of a diametrically extending pin 336 which is secured thereto and extends through a slot 337 of the shaft 292 and through a pair of aligning slots 338 formed in the sleeve 311. These slots 337 and 338 are elongated in the extension of the axis of the shaft 292. Therefore, the clutch plate 330 is free to move axially on the shaft 292 but cannot move rotationally on the shaft 292. Formed in the lower end of the shaft 292 is an opening 340 which is reached through a co-extensive opening 341 in the central bearing plate 68. Extending into these openings 340 and 341 is a release pin 342 having a slot 343 formed in the upper end thereof through which slot the diametrically extending pin 336 extends. The bottom of this slot 343 is provided with a point 344 which engages the diametrically extending pin 336. The lower end of the release pin 344 extends into an inner race 346 of a bearing, the outer race 347 of which bearing is pressed into a cylindrical recess 348 of a lever 350. As clearly shown in Fig. 12, the lever 350 is pivotally mounted on a shaft 351 which is supported by brackets 352, these brackets 352 being secured to the lower face of the central bearing plate 68. The free or extending end of the lever 350 is provided with a V-shaped downwardly opening slot 354 into which an upper end 355 of an adjuster 356 extends. This adjuster 356 is threaded through a threaded projection 357 of a link 358. The lower end of the threaded projection 352 is slotted, as shown, and body portions formed thereby are pressed inwardly so that there is a resilient pressure on the adjuster 356 which prevents it from moving out of adjustment. This construction eliminates the necessity of a lock nut or the like. The free end of the lever 350 extends into a yoke portion 359 of the link 358 and is thus centralized and positioned directly above the upper end of the adjuster 356. A stem 361 of the link 358 extends through an opening 362 provided in the central bearing plate 68 and the upper end thereof, attached to the lower end of a tension spring 363. The upper end of the tension spring 363 is attached to a screw 364 which is secured in the upper bearing plate 60. A resilient force, directed upwardly, is applied to the free end of the lever 350 by means of the tension spring 363 through the link 358. This forces the release pin 342 upwardly, forcing it against the diametrically extending pin 336 and thus forcing the clutch plate 330 into engagement with the gear 303. A greater or less pressure of the clutch plate 330 against the lower face 334 of the gear 303 may be acquired by changing the position of the adjuster 356 in the threaded projection 357 of the link 358.

The clutch plate 330 is disengaged from the gear 303 by means of a release member 366 having a portion 367 which extends through an opening 368 formed in the central bearing plate 68. The lower end of this portion 367 has a point 369 which engages the lever 350 in a recess 370. The upper end of this release member 366 is provided with a cylindrical cavity 372 into which a lower end 373 of a release shaft 374 extends. This release shaft 374 extends through openings 375 and 376 formed through the upper bearing plate 60 and the upper wall 61 of the traversing member 45. A flange 378 of the release shaft 374 is held in engagement with the interior face of the upper bearing plate 60 by means of the hub of an operating lever 379 which is secured to the upper end of the release shaft 374 by means of a suitable pin or rivet 380. The release member 366, as shown in Fig. 14, carries a diametrically extending pin 382 which extends through the upper part of the cavity 372. The lower end 373 of the release shaft 374 is provided with an elongated slot 383, through which the pin 382 extends. This construction provides against relative rotation between the release shaft and the release member but permits a relative axial movement between these parts.

Secured to the lower face of the upper bearing plate 60 and surrounding the lower end of the release shaft 374 and the upper end of the release member 366 is a cam member 385. This cam member 385 is secured in place by screws 386 which extend through a flange 387 of the cam member 385 into the bearing plate 60. Extending downwardly from the flange 387 is a cam portion 388 having cam faces 389 and diametrically opposing channels 390.

Cam followers 391 which, in this embodiment of my invention are shown as being extensions of the pin 382, are adapted to operate on the cam faces 389. The clutch plate 330 is removed from engagement with the lower face 334 of the gear 303 and the tilting control fly wheel 307 is disengaged from the chain of tilting control gears by moving the lever 379 through an arc of 90° into a position indicated by dotted lines 393 of Fig. 12. This rotates the release shaft 374 and the release member 366 a quarter of a revolution and moves the cam followers 391 along the cam faces 389 and into the channels 390.

As shown clearly in Fig. 12 and Fig. 14, it will be seen that the cam followers, and likewise the release member 366, are moved downward relative to the release shaft 374. This swings the lever 350 into a position indicated by the dotted lines 395 of Fig. 12. The release pin 342 is at this time lowered and the clutch plate 330 is allowed to be removed from engagement with the face 334 of the gear 303 by action of a compression spring 396 which is situated in the upper end of the opening 340 and which forces downwardly upon the diametrically extending pin 336. When the parts are in these positions the fly wheel is disengaged from the chain of tilting control gears and the tilting member 275 may be tilted at a higher velocity.

As shown in Fig. 4 the pivot member 30 is provided with an opening 398 which is ordinarily closed by a plug 399. This opening is provided to give access to the interior of the pivot member 30 for the purpose of adjusting the traversing clutch and the tilting clutch. As shown in Fig. 2, the upper part of the pivot member 30 is provided with a mark 400 and the lower part of the cylindrical wall 47 of the traversing member 45 is provided with a mark 401 and a mark 402. When the mark 400 and the mark 401 are in alignment, the adjuster 216 is positioned above the opening 398 in the pivot member 30 and may be reached for the purpose of adjustment with a screw driver. The screw driver will be extended through the opening 398 and through the opening provided in the lower bearing plate 73. While the mark 400 and the mark 402 are in alignment, the adjuster 356 is in the position above the opening 398 and may be reached by use of a suitable screw driver. The tilting member 275 may be locked in any position desired. As shown clearly in Fig. 4, a flange 405 extends downward inside the right leg 270 of the traversing member 45. Extending through an arcuated slot 406, shown in Fig. 2 as formed in this flange 405, is a shaft 407 having a head 408 formed on the inner end thereof. This shaft 407 extends through an opening 409 of the right leg 270 and has a nut finger 410 threaded on the extending end thereof. This nut 410 may be tightened so as to clamp the leg 270 and the flange 405 together, thus rendering the tilting member 275 immovable relative to the traversing member 45.

The camera 277 is tilted or panned, that is, tilted or traversed, by means of an operating lever 415 having a handle 416. As clearly shown in Figs. 17 and 18, the tilting member 275 is provided with a cylindrical projection 418 having a frusto-conical cavity 419 into which a frusto-conical end 420 of the operating lever 415 extends. A shaft 421 having an eccentric portion 422 extends through an opening 423 formed through the projection 418 just below the frusto-conical cavity 419 and at right angles thereto. The shaft 421 is secured in place by means of a collar 424 which is secured to one end thereof and by means of an operating handle 425 which is secured to the other end thereof.

The frusto-conical end 420 of the lever 415 is provided with channels 426. After the frusto-conical portion 420 has been inserted into the opening 419 the lever 425 is operated to rotate the shaft 421 so that the eccentric portion 422 thereof moves up into engagement with the frusto-conical end 420 of the lever 415, this unique portion 422 moving into an adjacent channel 426. By this construction the lever 415 may be locked in any one of various positions.

In marine work it is quite essential that the camera be kept always as level as possible and therefore it cannot move with the sway of the boat. The lower end 32 of the shaft 33 has threads 429 on which there is secured an eye 430 for use in lashing the tripod to a moving vehicle on which it may be desired to operate it. When using the tripod for marine work the nut 41 is advanced downwardly on the shaft 33 so that the pivot member 30 is not clamped to the supporting member 20. The legs of the tripod are tightly secured to the boat. The upper end of an arm 435 having a weight hung from its lower end is screwed rigidly upon the threads 429. This weighted arm serves as a pendulum and tends to keep the camera 277 level at all times regardless of the position of the boat.

As previously mentioned, it is very essential that all jerky movement be eliminated from the camera when it is being tilted or traversed. For this reason all play between the various operating parts of the tripod must be eliminated.

In the drawings I have shown all the gears, with the exception of the operating gear 281, as being split in the same manner as the driving gear 100 which was described in detail. When the gears are meshed, the upper and lower halves of teeth tend to move in opposite directions and thus prevent any play or backlash in the gears. The movable portion 107 of the drive gear 100 is locked from being moved by the set screw 123 until the gear 100 is engaged by the first traversing pinion 120. After such engagement the set screw is retracted. A relative movement between the stationary and movable parts 106 and 107 is then permitted, thus taking up any play or backlash. Any play between the operating gear segment 281 and the first tilting pinion 283 is eliminated by use of a set screw 432. The inner end of this set screw 432 engages a hardened insert 433 carried by the portion 280 of the tilting member 275. The set screw 432 forces the entire tilting member 275 to the right and causes an entire meshing of the teeth of the operating gear 281 and the first tilting pinion 283 and in this manner any play at this point is eliminated.

The operation of my invention is substantially as follows:

In setting up the tripod the legs 29 thereof are first positioned and it is not necessary to position these legs so that the head is absolutely level, due to the fact that the head is adjustable relative to the legs. After the legs have been rigidly positioned the nut 41 is loosened and the head is then adjusted in the cup-shaped portion 21 of the supporting member 20 so that it is level. The upper wall 61 of the traversing member 45 is provided with a level 436. When the head is leveled the nut 41 is advanced upwardly on the shaft 33 and the head is thus clamped to the supporting member 20. The camera 277 may then be secured to the tilting member 275. The pan and tilt of the camera is accomplished by operating the lever 415. As previously mentioned, it is necessary to follow the moving object traversely across a scene and sometimes vertically across the scene. It is very easy to follow an object moving in either of these directions, or both of these directions, due to the fact that only a single operating lever is provided.

The camera 277 may be quickly focused on a moving object by exerting a sudden force upon the lever 415. This sudden force is transmitted through the gears of the tripod and will cause a slipping of either of the clutch plates, thus allowing the camera to be moved without operating either of the fly wheels. If a gradual force is applied by means of the lever 415 the clutches of either of the chain of gears will not slip and the fly wheels will be connected therewith. These chains of gears and fly wheels absolutely prevent any jerky movement of the camera during tilting or panning thereof. If it is desired to follow a rather rapidly moving object, the traversing control fly wheel and the tilting control fly wheel may be disconnected from the chain of traversing control gears and the chain of tilting control gears by operating the levers 243 and 379. The clutch operating mechanisms and the clutch plates are at this time operated as previously described, which disconnects the fly wheels. The chains of gears without the fly wheels do not exert much opposition to the panning and tilting of the tripod and therefore these operations take place at a higher speed.

I claim as my invention:

1. A tripod comprising: a traversing member; a tilting member supported by said traversing member; means for permitting only a harmonious motion of said traversing member; means for permitting only a harmonious motion of said tilting member; and devices for selectively disconnecting either of said means.

2. A tripod comprising: a traversing member; a pivot member operatively supporting said traversing member; a tilting member operatively supported by said traversing member; a chain of traversing control gears for allowing only a harmonious traversing of said traversing member; a chain of tilting control gears for allowing only a harmonious tilting of said tilting member; and devices for selectively disconnecting either of said chains of control gears.

3. A tripod comprising: a traversing member; a pivot member operatively supporting said traversing member, said pivot member being adjustable in position so that said traversing member may be leveled; a tilting member operatively supported by said traversing member; a chain of traversing control gears for allowing only a harmonious traversing of said traversing member; a chain of tilting control gears for allowing only a harmonious tilting of said tilting member and devices for selectively disconnecting either of said chains of control gears.

4. A tripod comprising: a traversing member; a pivot member operatively supporting said traversing member; a tilting member operatively supported by said traversing member; a chain of traversing control gears for allowing only a harmonious traversing of said traversing member; means for disconnecting a part of said traversing control chain of gears for permitting said traversing member to be harmoniously traversed at a greater velocity; and a chain of tilting control gears for allowing only a harmonious tilting of said tilting member.

5. A tripod comprising: a traversing member; a pivot member operatively supporting said traversing member; a tilting member operatively supported by said traversing member; a chain of traversing control gears for allowing only a harmonious traversing of said traversing member; a chain of tilting control gears for allowing only a harmonious tilting of said tilting member; and means for disconnecting a part of said tilting control chain of gears to permit said tilting member to be tilted at a greater velocity.

6. A tripod comprising: a traversing member; a pivot member operatively supporting said traversing member; a tilting member operatively supported by said traversing member; a chain of traversing control gears for allowing only a harmonious traversing of said traversing member; means for disconnecting a part of said traversing control chain of gears for permitting said traversing member to be harmoniously traversed at a greater velocity; a chain of tilting control gears for allowing only a harmonious tilting of said tilting member; and means for disconnecting a part of said tilting control chain of gears to permit said tilting member to be tilted at a greater velocity.

7. A tripod comprising: a traversing member; a pivot member operatively supporting said traversing member; a tilting member operatively supported by said traversing member; a chain of traversing control gears for allowing only a harmonious traversing of said traversing member; a clutch situated in said chain of traversing control gears, said clutch being adapted to slip when a sudden force is applied so as to allow a quick focusing of a camera supported by said tripod; and a chain of tilting control gears for allowing only a harmonious tilting of said tilting member.

8. A tripod comprising: a traversing member; a pivot member operatively supporting said traversing member; a tilting member operatively supported by said traversing member; a chain of traversing control gears for allowing only a harmonious traversing of said traversing member; a chain of tilting control gears for allowing only a harmonious tilting of said tilting member; and a clutch situated in said chain of tilting control gears, being adapted to slip when a sudden force is applied so as to permit a quick focusing of a camera supported by said tripod.

9. A tripod comprising: a pivot member; a traversing member; means for rotatably supporting said traversing member on said pivot member; a bearing concentric to and carried by said traversing member; a shaft concentric to and extending through said concentric bearing and connecting to said pivot member, said shaft securing said traversing member rotatably to said pivot member; a supporting member having a semi-spherical face adapted to engage a semi-spherical face of said pivot member, said supporting member being adapted to adjustably support said pivot member; a clamp member having a semi-spherical face adapted to engage a second semi-spherical face of said supporting member, said clamp member having an opening through which an end of said shaft extends; and a nut placed on said shaft for clamping said clamp member and said pivot member securely to said supporting member.

10. A tripod comprising: a pivot member; a traversing member rotatably carried by said pivot member; a drive gear secured to said pivot member on the axis of rotation of said traversing member; a traversing member fly wheel carried by said traversing member; a chain of traversing control gears carried by said traversing member for driving said traversing member fly wheel, said traversing control chain of gears having a pinion adapted to engage said drive gear for operating said chain of traversing control gears when said traversing member is rotated; and means for disconnecting said traversing fly wheel from said chain of traversing control gears.

11. A tripod comprising: a pivot member; a traversing member rotatably supported by said pivot member; a tilting member tiltingly supported by said traversing member; an operating gear secured to said tilting member; a tilting member fly wheel carried by said traversing member; a chain of tilting control gears for driving said tilting member fly wheel carried by said traversing member having a pinion adapted to engage said operating gear whereby said chain of tilting control gears is operated; and means for disconnecting said tilting member fly wheel from said chain of tilting control gears.

In testimony whereof, I have hereunto set my hand at Los Angeles, California, this 27th day of August 1925.

FRANK E. GARBUTT.